Dec. 7, 1926.  E. MOLDENHAUER  1,609,525
SAFETY GAS TRAP
Filed Feb. 26, 1924   2 Sheets-Sheet 1
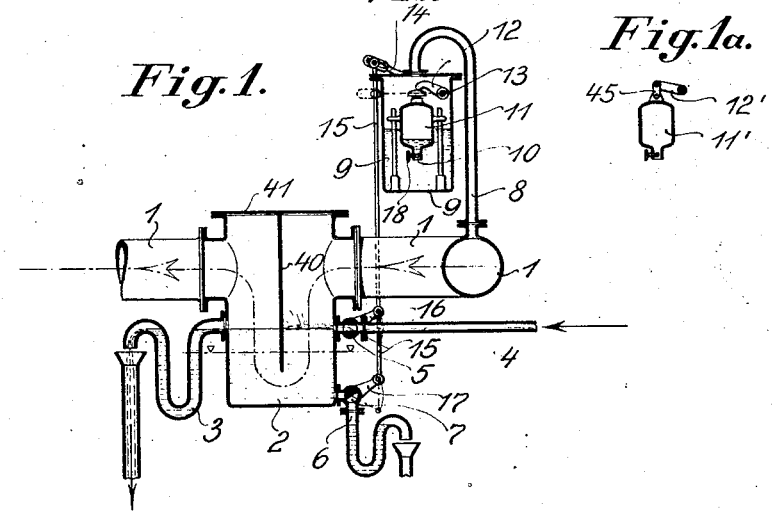
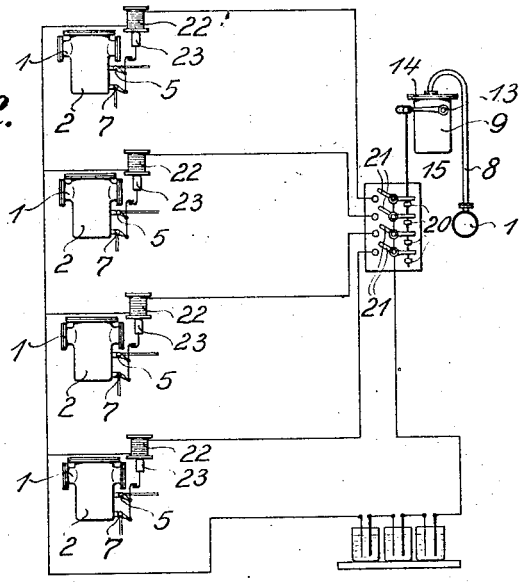
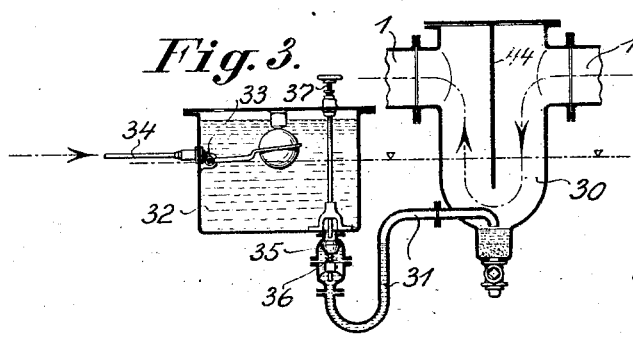
Inventor
Erich Moldenhauer

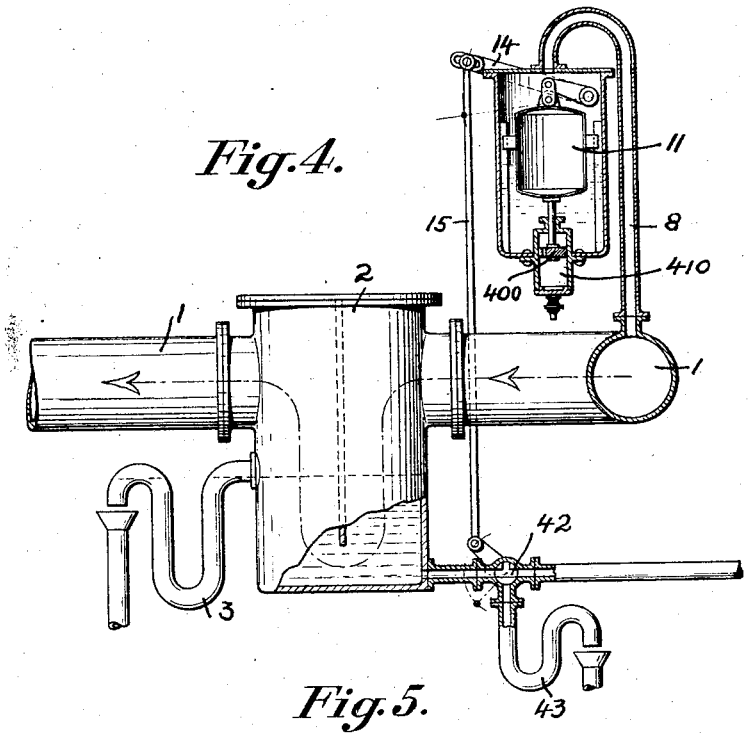
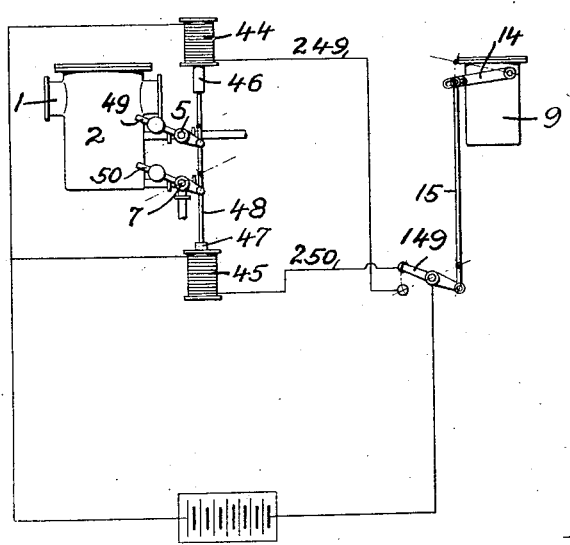

Patented Dec. 7, 1926.

1,609,525

UNITED STATES PATENT OFFICE.

ERICH MOLDENHAUER, OF DUSSELDORF, GERMANY.

SAFETY GAS TRAP.

Application filed February 26, 1924, Serial No. 695,267, and in Germany April 14, 1920.

My invention relates to improvements in automatic apparatus for controlling the flow of gas, and more particularly in apparatus for controlling the supply of gas from metallurgical furnaces such as blast furnaces to gas consumers. The object of the improvements is to provide a highly sensitive safety device in connection with the pressure main for automatically closing the main upon the pressure therein dropping below the normal degree, and for opening it again either by hand or automatically upon the normal gas pressure having been reestablished. With this object in view my invention consists in constructing the apparatus in the form of a water trap included in the gas pipe and providing automatic means for supplying water to the trap in case of a reduction of the pressure and for withdrawing the water, if the normal pressure has been reestablished, the supply of water to the trap being controlled by the pressure of the gas.

For the purpose of explaining the invention several examples embodying the same have been shown in the accompanying drawing in which, Fig. 1, is a sectional elevation showing the apparatus, Fig. 1ª, is a detail view showing a modification, Fig. 2, is a diagrammatical view showing a modification, and Fig. 3, is a sectional elevation showing another modification.

Fig. 4 is a side elevation, partly in section, of another modification, and Fig. 5 shows a diagrammatic layout of the electrical operation circuit of a modification.

In the example shown in Fig. 1 my improved apparatus comprises a water trap provided by a casing 2 having a vertical partition wall 40 extending from the cover 41 downwardly to a part away from the bottom of the casing, said trap being included in the gas pipe 1. At a part below the said pipe an overflow 3 including a trap, a water supply 4 including a valve 5, and a bottom discharge 6 including a valve 7 are connected with the casing. The gas pipe 1 is connected by a pipe 8 with the top part of a closed receptacle 9 containing water and including a float 11 having an opening 10 at its bottom and below the surface of the water. The top of the float is engaged by an arm 12 secured to a shaft 13 extending through the wall of the casing and carrying an arm 14 at its outer end connected by a rod 15 with arms 16 and 17 secured respectively to the cocks 5 and 7. The opening 10 can be obstructed more or less by a screw 18.

If the pressure within the gas pipe 1 is low the air within the float 11 expands and a comparatively large amount of water is expelled from the float which therefore rises and turns the arm 12. The upward movement of the arm is transmitted through the rod 15 to the cocks 5 and 7, so that the outlet valve 7 is closed and the inlet valve 5 opened. Therefore water is admitted to trap 2, and the flow of gas through the pipe 1 is shut off. If the pressure of the gas rises, the air within the float 11 is compressed and water flows into the same through the opening 10, so that the float sinks. In the construction shown in Figure 1 the arm 12 is in loose engagement with the float 11. Therefore, the valves 5 and 7 are not automatically operated when the gas pressure is reestablished and the float 11 sinks, the flow of gas through pipe 1 being established by hand by forcing the rod 15 downwardly in order to close the inlet valve 5 and to open the outlet valve 7 and to permit the discharge of the water from the trap 2. This construction is desirable, if no means are provided at the burner or other gas consumer for automatically igniting the gas and non-ignited gas would cause the production of an explosive mixture. Where automatic igniting means are provided I prefer a positive connection between the float 11 and the arm 12, so that the pipe 1 is automatically opened. Fig. 1ª shows an example in which the arm 12' is connected with the float 11' by a link 45.

To prevent the operation of the cocks 5 and 7 by small or short variations of the pressure of the gas I regulate the discharge 10 of the float 11 by means of the screw 18 so that the water is slowly expelled from the float. By means of the screw the sensitiveness of the apparatus can be regulated. I wish it to be understood that my invention is not limited to the use of the regulating means shown in Fig. 1. In Fig. 4 I have illustrated a somewhat modified construction, in which the operation of the float member 11 is controlled as to its responsiveness by a piston 400 and a brake cylinder 410 arrangement, and in which the separate cock 5 and the discharge siphon with its cock 7 of Fig. 1 are replaced by a two-way cock and siphon arrangement 42, 43.

In Fig. 2 I have shown a modification in which the apparatus controlled by the pressure of the gas is connected with electrical means for admitting or discharging the liquid to the trap 2. Thereby I am enabled to use a single controlling apparatus such as the float chamber in connection with a plurality of traps included each in a branch pipe of a main gas pipe. In Fig. 2 the construction of the float chamber and the trap is the same as that of the corresponding parts described with reference to Fig. 1 and the same reference characters have been used to indicate corresponding parts. As distinguished from Fig. 1, the rod 15 controlled by the float 11 carries collars 20 adapted to operate electric switches 21 for closing circuits including electromagnets 22 the cores 23 of which are connected with the cocks 5 and 7. If the construction is such that all the switches 21 are simultaneously operated by the collars 20 all the gas consumers are simultaneously disconnected from the gas supply. As shown in Fig. 2 the collars 20 are disposed different distances away from the switch arms, so that the consumers are successively disconnected from the gas supply, the consumers of minor importance being first disconnected, and thereafter the more important ones. In the construction shown in the figure the water is not discharged from the traps 2 by automatic means, but by hand. But in some cases I provide a construction in which the traps are automatically opened by interrupting the circuits including the electromagnets 22, or by means of separate circuits controlled by hand or by automatic means.

In the modifications shown in Fig. 3 the gas pipe 1 includes a water trap 30 communicating at its bottom through a pipe 31 with a receptacle 32 located at a higher level than the bottom of the receptacle 30 and the bottom part of the partition 44. By the pressure of the gas within the trap 30 the water is expelled therefrom and into the receptacle 32 so far that the column of water within the receptacle balances the pressure of the gas. In case of a reduction of the pressure of the gas the water flows back into the trap 30 so as to close the gas supply 1, the level of the water within the receptacle 32 being but slightly higher than that of the water within the trap.

To compensate any loss of water by vaporization the receptacle has a water supply 34 controlled by a float valve 33, which valve is opened if the water falls within the receptacle below a certain level after having partly filled the trap 30, so that the water is raised within the receptacle 32 and the trap to the normal level.

Also in this case I prefer to provide means for preventing automatic opening of the gas supply, if no automatic igniting means are provided at the gas consumers. As shown such means consist of a check valve 35 preventing the flow of water from the trap 30 to the receptacle 32 and permitting the flow of the water from the receptacle 32 to the trap 30 while putting a spring 36 under tension. For opening the trap 30 the valve is unseated by hand by means of the valve stem 37.

By the pressure of the spring 36 the flow of the water from the receptacle 32 to the trap 30 is retarded, so that the pipe is not closed by small or short variations of the pressure. Preferably means are provided for regulating the compression of the spring 36, so that the sensitiveness of the apparatus can be adapted to various conditions.

In Fig. 5 two electromagnets 44 and 45 are shown, the respective armatures 46 and 47 of which are interconnected by a rod 48 to which are linked the counter weighted levers 49 and 50 operating the cocks 5 and 7 respectively which control the influx and efflux of the water to and from the trap 2 as above described. The float-controlled lever 15 is linked to a switch lever 149, through which electric circuits 249 and 250 respectively are closable alternately through the two electromagnets 46 and 47 for respectively opening and closing the two trap cocks.

I claim:

1. In a safety gas trap of the character set forth, in combination with a pressure gas main, a trap interposed in said main, water inlet and outlet means for the trap, a gas pressure responsive device communicating with said pressure main, and means operable by said pressure responsive device and governing said water inlet and outlet means for controlling the water level in said trap.

2. In a safety gas trap of the character set forth, in combination with a pressure gas main, a trap interposed in said main, a water inlet cock and a water outlet cock communicating with said trap, a gas pressure responsive device in communication with said gas main and controlled by variations of the pressure therein, and means operable by said pressure responsive device, and operating said inlet and outlet cocks.

3. In a safety gas trap of the character set forth, in combination with a pressure gas main, a trap interposed in said main, water inlet and outlet means for said trap, a gas pressure responsive device communicating with said pressure main, comprising a liquid containing chamber, a float in said liquid, and a lever connection operating said water inlet and outlet means and in turn operable by said float.

4. In a safety gas trap of the character set forth, in combination with a pressure gas main, a trap interposed in said main, water inlet and outlet means for said trap, a gas pressure responsive device communicating with said pressure main, comprising a liquid containing chamber, a pressure controlled float in said chamber, and a lever connection operating said water inlet and outlet means and in turn operable by said float.

5. In a safety gas trap of the character set forth, in combination with a pressure gas main, a trap interposed in said main, water inlet and outlet control means for said trap, a gas pressure responsive device communicating with said pressure main, comprising a chamber containing a liquid, a pressure controlled float in said chamber, means associated with said float for controlling its responsiveness, and lever means interposed between said float and said water control means for operating the latter.

6. In a safety gas trap of the character set forth, in combination with a pressure gas main, a trap interposed in said gas main, a water inlet and outlet control for said trap, a gas pressure responsive device communicating with said gas main, including a pressure controlled float and means for regulating the responsiveness of said float, and means interposed between said float and said water control for operating the latter.

In testimony whereof I affix my signature.

ERICH MOLDENHAUER.